US010938487B2

United States Patent
Ruppel et al.

(10) Patent No.: US 10,938,487 B2
(45) Date of Patent: Mar. 2, 2021

(54) MONITORING A VEHICLE-TO-EVERYTHING COMMUNICATION SYSTEM

(71) Applicant: Aptiv Technologies Limited, St. Michael (BB)

(72) Inventors: Christopher D. Ruppel, Carmel, IN (US); Sunil Lingamurthy Javali, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 16 days.

(21) Appl. No.: 16/411,999

(22) Filed: May 14, 2019

(65) Prior Publication Data

US 2020/0366384 A1    Nov. 19, 2020

(51) Int. Cl.
*H04W 72/04* (2009.01)
*H04B 17/10* (2015.01)
*H04W 24/10* (2009.01)
*H04B 1/3822* (2015.01)
*H04W 4/44* (2018.01)

(52) U.S. Cl.
CPC ......... *H04B 17/101* (2015.01); *H04B 1/3822* (2013.01); *H04W 4/44* (2018.02); *H04W 24/10* (2013.01)

(58) Field of Classification Search
CPC ... H04B 17/101; H04B 1/3822; H04W 24/10; H04W 4/44
See application file for complete search history.

(56) References Cited

U.S. PATENT DOCUMENTS

| | | | |
|---|---|---|---|
| 9,671,785 B1 | 6/2017 | Bhatia et al. | |
| 2015/0249965 A1* | 9/2015 | Dussmann | H04W 52/243 455/501 |
| 2016/0134383 A1* | 5/2016 | Banasky, Jr. | H04B 1/40 455/67.14 |
| 2018/0120845 A1 | 5/2018 | Lambermont et al. | |
| 2018/0160380 A1* | 6/2018 | Dussmann | H04B 7/024 |
| 2018/0176930 A1 | 6/2018 | Welsch | |
| 2018/0212667 A1* | 7/2018 | Chen | H04B 17/318 |
| 2019/0082313 A1* | 3/2019 | Kerselaers | H04W 52/383 |

* cited by examiner

*Primary Examiner* — Hassan Kizou
*Assistant Examiner* — Mahbubul Bar Chowdhury
(74) *Attorney, Agent, or Firm* — Colby Nipper PLLC

(57) ABSTRACT

An illustrative example vehicle to everything (V2X) system includes at least one V2X antenna and a V2X transceiver coupled with the V2X antenna. The V2X transceiver is configured to communicate using a first frequency band. A receiver is configured to receive communications on at least a second frequency band that is different than the first frequency band. A controller is configured to selectively cause the receiver to be configured to receive communications on the first frequency band and determine a condition of at least one of the V2X transceiver and the V2X antenna based on an indication from the receiver regarding any communication received by the receiver on the first frequency band from the V2X transceiver and the V2X antenna.

18 Claims, 2 Drawing Sheets

MONITORING A VEHICLE-TO-EVERYTHING COMMUNICATION SYSTEM

BACKGROUND

Vehicle to everything (V2X) communications are intended to provide connectivity between an automotive vehicle and its environment. V2X communications may be useful for vehicle-to-vehicle communications, vehicle-to-infrastructure communications and vehicle-to-pedestrian communications. V2X communications utilize high-bandwidth, low-latency wireless links to facilitate data exchange in a rapid and reliable manner.

V2X communications require at least one antenna and a transceiver on board a vehicle for the specialized communications. One issue that has to be addressed is ensuring that the V2X system is working properly. It can be challenging to monitor the V2X system without introducing cost or complexity. Proposed V2X systems include a self-monitoring capability but that is limited to monitoring the transmitter-amplifier output and cannot monitor other components of the V2X system, such as the antenna.

SUMMARY

An illustrative example embodiment of a vehicle to everything (V2X) system includes at least one V2X antenna and a V2X transceiver coupled with the V2X antenna. The V2X transceiver is configured to communicate using a first frequency band. A receiver is configured to receive communications on at least a second frequency band that is different than the first frequency band. A controller is configured to selectively cause the receiver to be configured to receive communications on the first frequency band and determine a condition of at least one of the V2X transceiver and the V2X antenna based on an indication from the receiver regarding any communication received by the receiver on the first frequency band from the V2X transceiver and the V2X antenna.

In an example embodiment having one or more features of the V2X system of the previous paragraph, the V2X antenna, the V2X transceiver, the receiver and the controller are all supported on a single vehicle.

In an example embodiment having one or more features of the V2X system of any of the previous paragraphs, the V2X antenna is in a first fixed position on the vehicle and the receiver is in a second fixed position on the vehicle.

In an example embodiment having one or more features of the V2X system of any of the previous paragraphs, there is a path loss associated with a difference between the first fixed position and the second fixed position, and the controller is configured to determine the condition of at least one of the V2X transceiver and the V2X antenna based at least in part on the path loss.

In an example embodiment having one or more features of the V2X system of any of the previous paragraphs, the receiver is a Wi-Fi receiver.

In an example embodiment having one or more features of the V2X system of any of the previous paragraphs, the first frequency band has a lower limit of 5.85 GHz, the second frequency band has an upper limit 5.8 GHz, and the controller is configured to cause the receiver to be configured to receive communications at a frequency that is at least 5.85 GHz.

In an example embodiment having one or more features of the V2X system of any of the previous paragraphs, the receiver has an associated transmitter; the controller is configured to cause the transmitter to at least temporarily transmit using the first frequency band or to cause the V2X antenna and V2X transceiver to at least temporarily be configured to receive a communication from the transmitter on the second frequency band; and the controller is configured to determine a second condition of at least one of the V2X transceiver and the V2X antenna based on a communication from the transmitter that is received by the V2X antenna.

In an example embodiment having one or more features of the V2X system of any of the previous paragraphs, the condition is a transmitting condition and the second condition is a receiving condition.

An illustrative example method of monitoring a vehicle to everything (V2X) system, which has at least one V2X antenna and a V2X transceiver that are configured to communicate using a first frequency band, includes selectively causing a receiver that is configured to receive communications on at least a second frequency band to be configured to receive communications on the first frequency band, wherein the second frequency band is different than the first frequency band; and determining a condition of at least one of the V2X transceiver and the V2X antenna based on an indication from the receiver regarding any communication received by the receiver on the first frequency band from the V2X transceiver and the V2X antenna.

In an example embodiment having one or more features of the method of the previous paragraph, the V2X antenna, the V2X transceiver, the receiver and the controller are all supported on a single vehicle.

In an example embodiment having one or more features of the method of any of the previous paragraphs, the V2X antenna is in a first fixed position on the vehicle, the receiver is in a second fixed position on the vehicle, there is a path loss associated with a difference between the first fixed position and the second fixed position, and determining the condition of at least one of the V2X transceiver and the V2X antenna is based at least in part on the path loss.

In an example embodiment having one or more features of the method of any of the previous paragraphs, the receiver is a Wi-Fi receiver.

In an example embodiment having one or more features of the method of any of the previous paragraphs, the first frequency band has a lower limit of 5.85 GHz, the second frequency band has an upper limit 5.8 GHz, and selectively causing the receiver to be configured to receive communications on the first frequency comprises causing the receiver to be configured to receive communications at a frequency that is at least 5.85 GHz.

An example embodiment having one or more features of the method of any of the previous paragraphs includes selectively causing a transmitter associated with the receiver to at least temporarily transmit using the first frequency band or selectively causing the V2X transceiver to at least temporarily receive a communication on the second frequency band, and determining a second condition of at least one of the V2X transceiver and the V2X antenna based on an indication from the V2X transceiver regarding any communication from the transmitter that is received by the V2X transceiver.

In an example embodiment having one or more features of the method of any of the previous paragraphs, the condition is a transmitting condition and the second condition is a receiving condition.

Another illustrative example embodiment of a vehicle to everything (V2X) system includes V2X communication means for communicating using a first frequency band, second communication means for at least receiving communications on a second frequency band that is different than the first frequency band, and control means for selectively causing the second communication means to be configured for receive communications on the first frequency band and for determining a condition of the V2X communication means based on an indication from the second communication means regarding any communication received by the second communication means on the first frequency band from the V2X communication means.

In an example embodiment having one or more features of the V2X system of the previous paragraph, the V2X communication means, the second communication means, and the control means are all supported on a single vehicle.

In an example embodiment having one or more features of the V2X system of any of the previous paragraphs, the V2X communication means comprises at least one V2X antenna in a first fixed position on the vehicle; the second communication means is in a second fixed position on the vehicle; there is a path loss associated with a difference between the first fixed position and the second fixed position; and the control means determines the condition of at least one of the V2X transceiver and the V2X antenna based at least in part on the path loss.

In an example embodiment having one or more features of the V2X system of any of the previous paragraphs, the first frequency band has a lower limit of 5.85 GHz, the second frequency band has an upper limit 5.8 GHz, and the control means causes the second communication means to receive communications at a frequency that is at least 5.85 GHz.

In an example embodiment having one or more features of the V2X system of any of the previous paragraphs, the control means selectively causes the second communication means to at least temporarily transmit using the first frequency band; the control means is further for determining a second condition of the V2X communication means based on a communication from the second communication means that is received by the V2X communication means; the condition is a transmitting condition; and the second condition is a receiving condition.

The various features and advantages of at least one disclosed example embodiment will become apparent to those skilled in the art from the following detailed description. The drawings that accompany the detailed description can be briefly described as follows.

DETAILED DESCRIPTION

Figure 1:
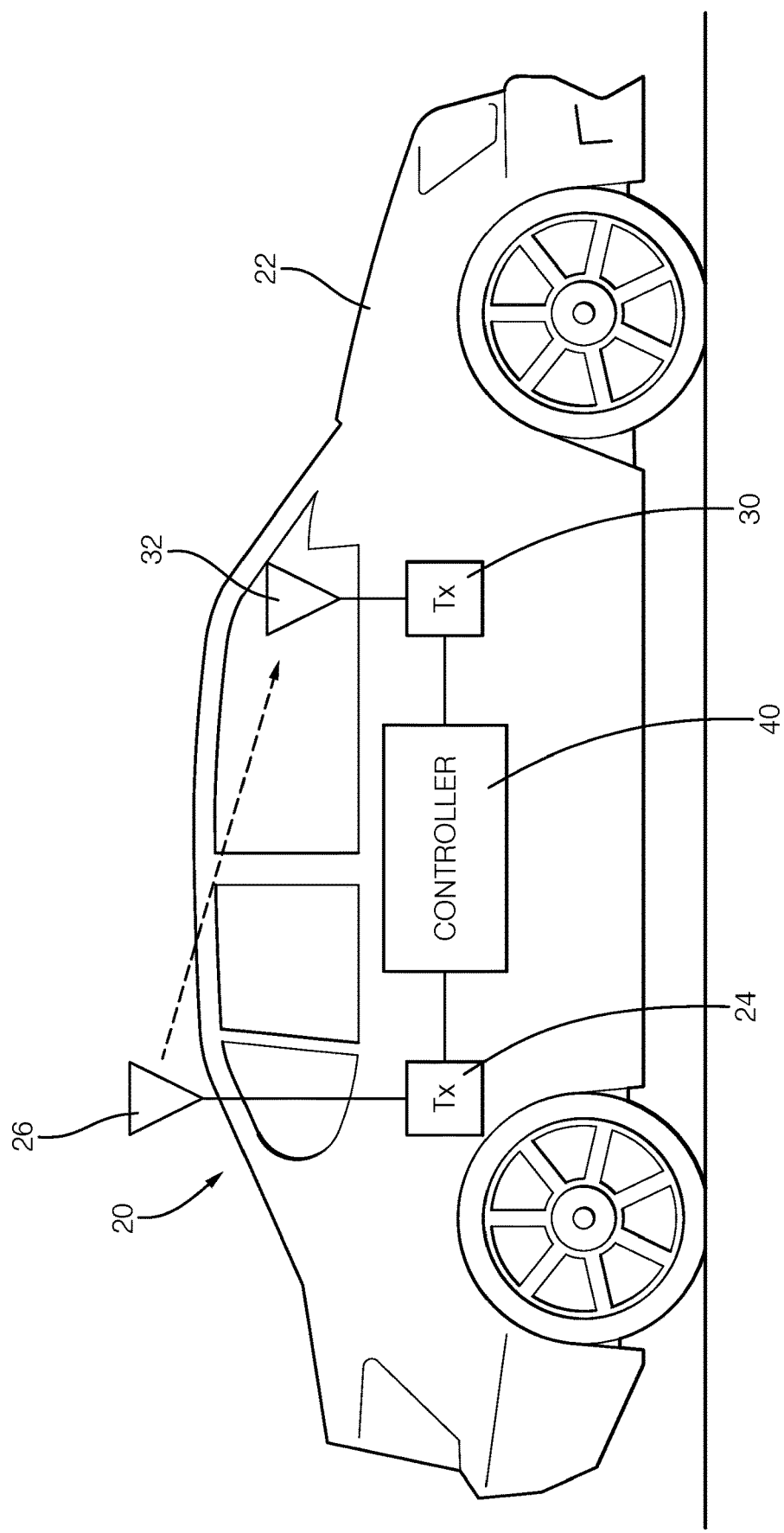
FIG. 1 diagrammatically illustrates an example vehicle including a vehicle to everything (V2X) system.

FIG. 1 schematically illustrates a vehicle to everything (V2X) system 20 onboard a vehicle 22. The V2X system 20 includes a transceiver 24 and at least one associated antenna 26. The transceiver 24 is configured for communicating on a first frequency band that is allocated for V2X communications, which may be referred to as a V2X frequency band. For example, the first frequency band has a lower limit of 5.85 GHz and an upper limit of 5.925 GHz.

Another transceiver 30 is supported on the vehicle 22. The transceiver 30 is associated with an antenna 32 and is configured for communications on a second frequency band that is different than the first frequency band. In the illustrated example embodiment, the transceiver 30 is configured as a Wi-Fi transceiver that communicates on known frequencies allocated for Wi-Fi communications. For example, the second frequency band has an upper limit of 5.8 GHz.

While schematically shown and described as transceivers 24 and 30, some embodiments include devices that include separate transmitters and receivers.

A controller 40 includes at least one computing device, such as processor, and memory. The controller 40 selectively causes the Wi-Fi transceiver 30 and antenna 32 to be configured to communicate on the first frequency band for purposes of monitoring a condition of the V2X system 20.

Figure 2:
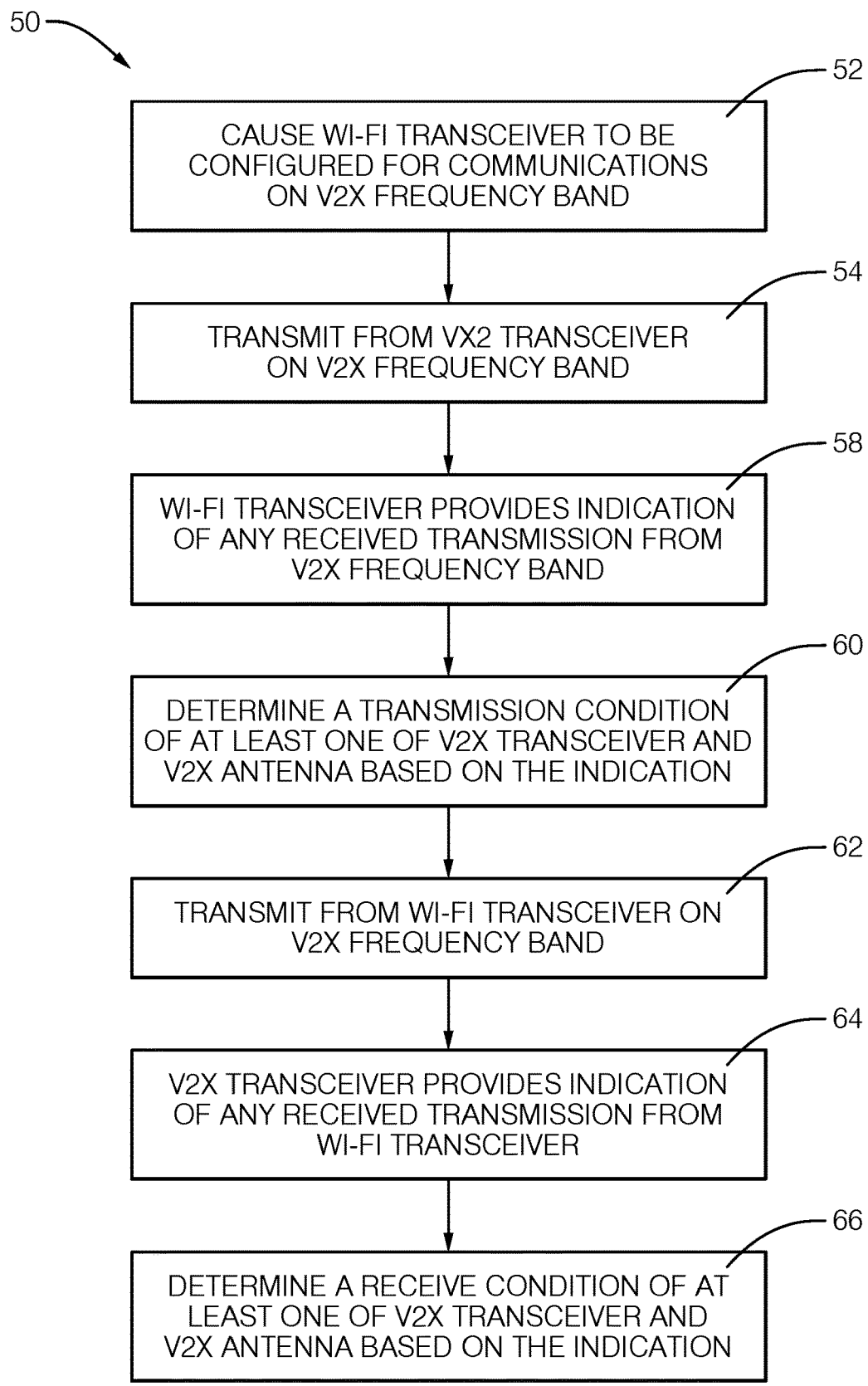
FIG. 2 is a flowchart diagram summarizing an example technique for monitoring the example V2X system.

FIG. 2 is a flowchart diagram 50 that summarizes an example approach. At 52, the controller 40 causes the Wi-Fi transceiver 30 to be configured for communications on the V2X frequency band. The transceiver 30 and antenna 32 in this example have the capability of communicating beyond the allocated Wi-Fi frequency band on at least a temporary basis. While the Wi-Fi transceiver 30 is configured for communications on the V2X frequency band, the controller 40 instructs or causes the transceiver 40 to transmit at least one communication on the V2X frequency band at 54. In an example embodiment, the transmission from the V2X transceiver 24 has known content and characteristics, such as transmit power.

At 58, the Wi-Fi transceiver 30 provides an indication of any received transmission from the V2X transceiver 24. Based on the indication from the Wi-Fi transceiver 30, the controller 40 determines a transmit condition of at least one of the V2X transceiver 24 and the V2X antenna 26 at 60. If, for example, there is a problem with the antenna 26 or the connection between the antenna 26 and the V2X transceiver 24, the indication from the Wi-Fi transceiver 30 will provide information to the controller 40 that a received communication does not correspond to the expected reception based on what the transceiver 24 was supposed to communicate using the first, V2X frequency band. In some instances the indication from the transceiver 30 will correspond to the absence of any received communication from the V2X system 20. The indication from the Wi-Fi transceiver 30 is interpreted by the controller 40 in a manner that allows the controller 40 to determine if the V2X system 20 is working as desired or to diagnose one or more potential problems with the V2X system 20.

In the illustrated example, the antennas 26 and 32 are in respective fixed positions on the vehicle 22. Depending on their respective locations and the configuration of the vehicle 22, there may be a RF path loss associated with the difference in the respective antenna positions. The controller 40 is configured to include information regarding such a path loss when analyzing any communication received by the transceiver 30 from the V2X system 20. For example, a nominal radio frequency coupling between the antennas 26 and 32 may include a −50 dB antenna-coupling gain at 5.9 GHz. If the expected transmission from the V2X system 20 is at 23 dBm, then the expected nominal radio frequency received signal strength (RSSI) at the WiFi system will be −27 dBm. In some examples, the transceiver 30 provides an indication to the controller 40 whenever such an expected signal strength is detected. The example embodiment allows for estimating the effective gain or equivalent or isotropically radiated power of the V2X antenna 26.

In other example embodiments, the transceiver 30 provides an indication of any communication received on the first, V2X frequency band and the controller 40 determines whether the received signal corresponds to that which is expected based on a preselected transmission from the V2X system 20.

The condition determined at 60 in FIG. 2 relates to the transmission or transmit characteristics of the V2X system 20. The illustrated example embodiment is also capable of monitoring the reception characteristics of the V2X system 20. At 62, the controller 40 facilitates communications from the Wi-Fi transceiver 30 to the V2X system 20. In the illustrated example, the controller 40 instructs or causes the Wi-Fi transceiver 30 to transmit at least one communication on the first, V2X frequency band. In other embodiments, the controller 40 instructs or causes the V2X antenna 26 and transceiver 24 to at least temporarily be configured to receive a communication on the second frequency band.

At 64, the V2X transceiver 24 provides an indication of any received transmission from the Wi-Fi transceiver 30 as received by the antenna 26. At 66, the controller 40 determines a receiving condition of at least one of the V2X transceiver 24 and the V2X antenna 26 based on that indication. For example, when the Wi-Fi transceiver 30 transmits a known communication through the antenna 32, the controller 40 determines whether an indication from the transceiver 24 regarding a received communication shows correspondence between that which was transmitted by the Wi-Fi transceiver 30 and that which was received by the V2X transceiver 24. When there is a sufficient level of correspondence, the received condition of the V2X system 20 is considered satisfactory.

One feature of the example system and approach is that a transceiver on board a vehicle can be utilized to monitor one or more conditions of the V2X system 20 on the same vehicle 22. This approach allows for achieving reliable V2X system monitoring without introducing additional complexity or cost. For example, it is not necessary to add additional V2X monitor receivers or any radio frequency tapping sub-circuits or directional-couplers, which would increase the cost associated with having a V2X system on board a vehicle. Additionally, the disclosed example arrangement is capable of detecting more than simply shorts or open circuits associated with an antenna coupling and provides the ability to monitor features such as antenna gain and the operational capability of various components (not necessarily illustrated) of the V2X system 20. The transmitting condition and the receiving condition of the V2X system 20 can be monitored or diagnosed in the example embodiment.

Additionally, when the V2X system 20 includes two V2X antennas, the example approach provides superior diagnostic capabilities for the individual V2X antennas. Communications between each of the V2X antennas 26 and the Wi-Fi antenna 32 allow for monitoring or diagnosing the condition of each V2X antenna. Communications between the two V2X antennas are not reliable for checking the transmit and receive condition of each antenna because the transceiver circuitry tends to have enough leakage that a coupling between the V2X RF paths occurs on the circuit board of the transceiver. In other words, the potential for RF path-to-path leakage on the transceiver circuit board masks the actual condition of the individual V2X antennas if one of the them were used to communicate with the other. The separate WiFi antenna 32 and Wi-Fi transceiver 30 are not susceptible to the path-to-path RF coupling that can exist on the V2X transceiver circuit board.

While the transceiver 30 and the antenna 32 in the illustrated embodiment are described as being configured for Wi-Fi communications, some embodiments include transceivers other than the V2X transceiver 24 that are configured for communications using other protocols or other frequency bands. Such transceivers are useful in an embodiment like that disclosed above provided that they have the capability of being at least temporarily controlled or configured to operate within the V2X frequency band for monitoring or diagnosing a condition of the V2X system 20.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle to everything (V2X) system, comprising:
   at least one V2X antenna;
   a V2X transceiver coupled with the V2X antenna, the V2X transceiver being configured to communicate using a first frequency band designated for V2X communications;
   a receiver that is configurable to receive first communications on at least a second frequency band used for communications other than V2X communications and that is different than the first frequency band, the receiver being further configurable to receive V2X communications on the first frequency band, the receiver being a Wi-Fi receiver capable of communicating on one or more frequency bands allocated for Wi-Fi communications, the one or more frequency bands allocated for Wi-Fi communications including the second frequency band; and
   a controller configured to:
      selectively cause the receiver to be configured to receive the first communications on the second frequency band;
      selectively cause the receiver to be configured to receive the V2X communications on the first frequency band; and
      determine a condition of at least one of the V2X transceiver and the V2X antenna based on an indication from the receiver regarding any V2X communication received by the receiver on the first frequency band from the V2X transceiver and the V2X antenna.

2. The V2X system of claim 1, wherein the V2X antenna, the V2X transceiver, the receiver and the controller are all supported on a single vehicle.

3. The V2X system of claim 2, wherein
   the V2X antenna is in a first fixed position on the vehicle; and
   the receiver is in a second fixed position on the vehicle.

4. The V2X system of claim 3, wherein
   there is a path loss associated with a difference between the first fixed position and the second fixed position; and
   the controller is configured to determine the condition of at least one of the V2X transceiver and the V2X antenna based at least in part on the path loss.

5. The V2X system of claim 1, wherein
   the first frequency band is a band associated with a V2X communications standard;
   the second frequency band does not include any frequencies of the first frequency band; and
   the controller is configured to cause the receiver to be configured to receive communications at a frequency that is associated with the V2X communications standard.

6. The V2X system of claim 1, wherein
the receiver has an associated transmitter;
the controller is configured to cause the transmitter to at least temporarily transmit using the first frequency band or to cause the V2X antenna and V2X transceiver to at least temporarily be configured to receive a communication from the transmitter on the second frequency band; and
the controller is configured to determine a second condition of at least one of the V2X transceiver and the V2X antenna based on a communication from the transmitter that is received by the V2X antenna.

7. The V2X system of claim 6, wherein
the condition is a transmitting condition; and
the second condition is a receiving condition.

8. A method of monitoring a vehicle to everything (V2X) system that includes at least one V2X antenna and a V2X transceiver that are configured to communicate using a first frequency band designated for V2X communications, the method comprising:
selectively causing a receiver to be configured to receive V2X communications on the first frequency band, the receiver being further configurable to receive first communications on at least a second frequency band used for communications other than V2X communications and that is different than the first frequency band, the receiver being a Wi-Fi receiver capable of communicating on one or more frequency bands allocated for Wi-Fi communications, the one or more frequency bands allocated for Wi-Fi communications including the second frequency band; and
determining a condition of at least one of the V2X transceiver and the V2X antenna based on an indication from the receiver regarding any V2X communication received by the receiver on the first frequency band from the V2X transceiver and the V2X antenna.

9. The method of claim 8, wherein the V2X antenna, the V2X transceiver, the receiver and the controller are all supported on a single vehicle.

10. The method of claim 9, wherein
the V2X antenna is in a first fixed position on the vehicle;
the receiver is in a second fixed position on the vehicle;
there is a path loss associated with a difference between the first fixed position and the second fixed position; and
determining the condition of at least one of the V2X transceiver and the V2X antenna is based at least in part on the path loss.

11. The method of claim 8, wherein
the first frequency band is a band associated with a V2X communications standard;
the second frequency band has a range that does not include any frequencies of the first frequency band; and
selectively causing the receiver to be configured to receive communications on the first frequency comprises causing the receiver to be configured to receive communications at a frequency that is associated with a V2X communications standard.

12. The method of claim 8, comprising
selectively causing a transmitter associated with the receiver to at least temporarily transmit using the first frequency band or selectively causing the V2X transceiver to at least temporarily receive a communication on the second frequency band; and
determining a second condition of at least one of the V2X transceiver and the V2X antenna based on an indication from the V2X transceiver regarding any communication from the transmitter that is received by the V2X transceiver.

13. The method of claim 12, wherein
the condition is a transmitting condition; and
the second condition is a receiving condition.

14. A vehicle to everything (V2X) system, comprising:
V2X communication means for first communicating using a first frequency band designated for V2X communications;
second communication means for at least: receiving communications on a second frequency band used for communications other than V2X communications and that is different than the first frequency band, and receiving V2X communications on the first frequency band, the second communication means comprising a Wi-Fi receiver capable of communicating on one or more frequency bands allocated for Wi-Fi communications, the one or more frequency bands allocated for Wi-Fi communications including the second frequency band; and
control means for selectively causing the second communication means to be configured for receiving V2X communications on the first frequency band and for determining a condition of the V2X communication means based on an indication from the second communication means regarding any communication received by the second communication means on the first frequency band from the V2X communication means.

15. The V2X system of claim 14, wherein the V2X communication means, the second communication means, and the control means are all supported on a single vehicle.

16. The V2X system of claim 14, wherein
the V2X communication means comprises at least one V2X antenna in a first fixed position on the vehicle;
the second communication means is in a second fixed position on the vehicle;
there is a path loss associated with a difference between the first fixed position and the second fixed position; and
the control means determines the condition of at least one of the V2X transceiver and the V2X antenna based at least in part on the path loss.

17. The V2X system of claim 14, wherein
the first frequency band is a band associated with a V2X communications standard;
the second frequency band has a range that does not include any frequencies of the first frequency band; and
the control means causes the second communication means to receive communications at a frequency that is associated with a V2X communications standard.

18. The V2X system of claim 14, wherein
the control means selectively causes the second communication means to at least temporarily transmit using the first frequency band;
the control means is further for determining a second condition of the V2X communication means based on a communication from the second communication means that is received by the V2X communication means;
the condition is a transmitting condition; and
the second condition is a receiving condition.

* * * * *